(12) United States Patent
Hart

(10) Patent No.: US 6,460,562 B1
(45) Date of Patent: Oct. 8, 2002

(54) DUAL TANK SIMULTANEOUS FILL SYSTEM

(75) Inventor: Mitchell E. Hart, Grand Blanc, MI (US)

(73) Assignee: General Motors Corporation, Detroit, MI (US)

(*) Notice: Subject to any disclaimer, the term of this patent is extended or adjusted under 35 U.S.C. 154(b) by 59 days.

(21) Appl. No.: 09/718,197

(22) Filed: Nov. 22, 2000

(51) Int. Cl.[7] .......................... B65D 25/00; F16K 24/00
(52) U.S. Cl. .............. 137/351; 137/565.37; 137/561 A; 137/589; 137/592
(58) Field of Search .................................. 137/255, 265, 137/565.37, 587, 589, 592, 561 A, 561 R, 351

(56) References Cited

U.S. PATENT DOCUMENTS

| | | | |
|---|---|---|---|
| 3,349,803 A | * 10/1967 | Bougeois | 137/561 R |
| 3,736,955 A | * 6/1973 | Schlesser | 137/561 A |
| 3,744,513 A | * 7/1973 | Leitenberger | 137/255 |
| 4,765,359 A | 8/1988 | Burnett | 137/255 |
| 5,983,932 A | 11/1999 | Wagner et al. | 137/587 |

FOREIGN PATENT DOCUMENTS

DE 2512074 * 10/1975 ............. 137/561 A

* cited by examiner

*Primary Examiner*—A. Michael Chambers
(74) *Attorney, Agent, or Firm*—Laura C. Hargitt

(57) ABSTRACT

A fuel tank system for a vehicle, the fuel tank system having multiple independent tanks fluidly connected to a single fuel filling port on the vehicle, and a T-connector for directing the fuel to the multiple tanks. The fuel filling port is fluidly connected to the tanks through the T-connector, which is configured to direct the fuel to one of tanks until that tank is filled, and then to divert the fuel to the second tank. The second tank includes a vapor vent, and both tanks are connected by a vapor line, the vapor venting system configured so that a nozzle shut-off back pressure is not developed until the second tank is filled to its fill line. The configuration of the dual tanks and their fluid connection to the fuel inlet port allows the tanks to be substantially filled independently of relative fill levels between tanks, fuel and ambient temperature, fuel reid vapor pressure, or vehicle attitude.

10 Claims, 1 Drawing Sheet

DUAL TANK SIMULTANEOUS FILL SYSTEM

BACKGROUND OF THE INVENTION

1. Field of the Invention

The invention relates to a multiple fuel tank system for an automotive vehicle. In one of its aspects, the invention relates to the fuel filling conduit system for a dual fuel tank system. In another of its aspects, the invention relates to a fuel filling and vapor venting system for a dual fuel tank system in a vehicle. In another of its aspects, the invention relates to a tubing connector configured to direct all fuel entering an inlet port to a first outlet port, and responsive to conditions at the first outlet port to redirect flow to a second outlet port.

2. Related Art

Multiple fuel tank systems for automotive vehicles are well known, for increasing fuel capacity in an automotive vehicle to increase its driving range. Numerous methods have been employed to provide a filling capability for the multiple fuel tanks as well as the capability for drawing fuel from those tanks to feed the internal combustion engine of the vehicle. Structures for filling the fuel tanks have ranged from having individual fuel inlet ports, for instance on each side of the vehicle, to a single fuel inlet port with a Y-type connector to split the fuel flow. Another system, disclosed in U.S. Pat. 5,983,932 and commonly owned, comprises a cross-flow pipe between the multiple fuel tanks to allow simultaneous filling of the fuel tanks from a single inlet port. As the fuel level in a first fuel tank rises, the fuel will naturally flow to the second fuel tank, the fuel seeking its own level between the connected tanks.

An alternative method of filling multiple fuel tanks is disclosed in U.S. Pat. No. 4,765,359, which discloses multiple fuel inlet ports, preferably located on opposite sides of an automotive vehicle, connected to a common fuel tank filling manifold, whereby pumping fuel into either of the inlet ports directs fuel into the manifold, thereby filling the fuel tanks.

A common limitation of the prior art fuel tank systems is that effective filling of the multiple fuel tanks is largely dependent upon relative fill levels between tanks, fuel and ambient temperature, fuel reid vapor pressure, and vehicle attitude.

For instance, if the vehicle is sitting on an incline, a fuel tank on the lower end of the incline will be filled sooner than higher fuel tanks, thus potentially shutting off the fuel flow prior to complete filling of the tanks, or causing an overflow through any vapor exhaust systems prior to completely filling both of the tanks. Another issue in dealing with multiple fuel tanks occurs in the cross-feed conduits. Located near the bottom of the fuel tanks to maintain a common level in the tanks, they can often be plugged by contaminants that settle to the bottom of the tanks, or can be blocked by water that settles to the bottom of the tanks and then freezes in the cross-feed conduit. In such a condition, fuel drawn from one of the tanks to feed the internal combustion engine could not be appropriately replenished by the second fuel tank, or filling the tanks from a single fuel inlet port would fill the first tank, but not the second tank now fluidly isolated due to the plugged conduit.

It would be advantageous to provided a dual tank simultaneous fill system that is not susceptible to the limitations of a cross-feed conduit, and is a further adaptable to filling both tanks to capacity independent of the attitude of the vehicle during fueling.

SUMMARY OF THE INVENTION

The invention relates to a fuel supply system for an automotive vehicle of the type having an internal combustion engine, the fuel supply system including at least two fuel storage tanks, a fuel pumping mechanism for transporting fuel from at least one of the storage tanks to the engine, a fuel transfer system for conveying fuel from one of the storage tanks to another of the storage tanks, and a fuel filling system for adding fuel to the system from a gas station, the fuel filling system comprising a single fuel inlet port. The fuel supply system further includes a T-connector fluidly connecting the fuel inlet port with the at least two fuel storage tanks, the T-connector including an inlet opening and first and second outlet openings, the first outlet opening fluidly connected to a first tank and the second outlet opening fluidly connected to at least a second storage tank, the T-connector configured to direct all fuel through the first outlet opening until the first tank is full, then to direct fuel through the second outlet opening.

Other objects, features, and advantages of the invention will be apparent from the ensuing description in conjunction with the accompanying drawings.

DETAILED DESCRIPTION

Figure 1:
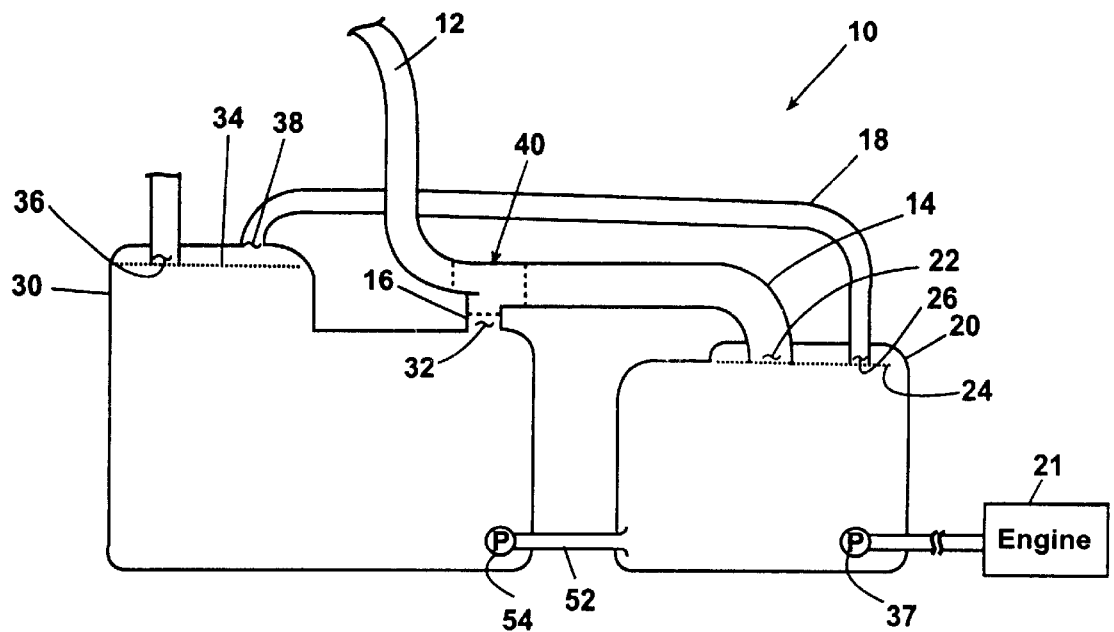
FIG. 1 is a schematic representation of a dual fuel tank simultaneous fill system according to the invention.

Referring to FIG. 1, a dual tank simultaneous fill system 10, according to the invention, comprises a first fuel tank 20 and a second fuel tank 30, each fluidly connected to a fuel inlet line 12. First tank 20 is fluidly connected to fuel inlet line 12 through a first tank branch line 14 and flow-directing T-connector 40. Second tank 30 is fluidly connected to fuel inlet line 12 through the second tank branch line 16 and T-connector 40. First tank 20 is further fluidly connected to first tank branch line 14 through first tank inlet opening 22. Second tank 30 is further connected to second tank branch line 16 by second tank inlet 32. First and second tanks 20, 30 are further fluidly connected by a vapor relief line 18 from a first tank vent/overflow outlet 26 to a second tank overflow inlet 38. Second tank 30 further comprises a vapor relief outlet 36 appropriately vented to atmosphere as is well known in the art. Fuel is transported from tank 20 to the internal combustion engine 21 via a fuel pumping mechanism 37.

Figure 2:
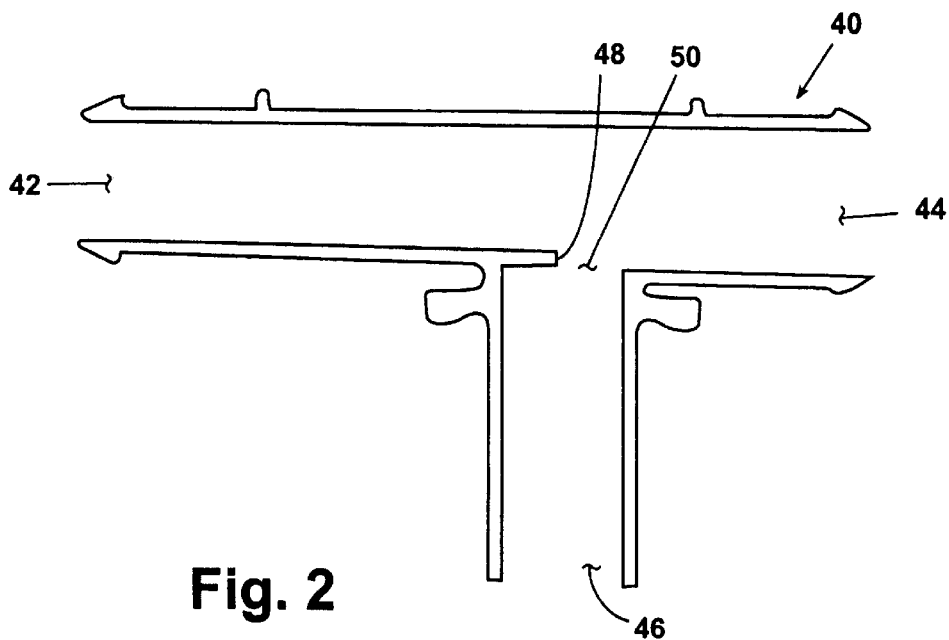
FIG. 2 is an enlarged cross sectional view of a flow-directing T-connector for the system of FIG. 1.

Referring now to FIG. 2, the flow-directing T-connector 40 comprises an inlet port 42, a first outlet port 44, and a second outlet port 46. The inlet port 42 and first outlet port 44 are generally linearly aligned. Second outlet port 46 is arranged to depend from T-connector 40, perpendicular to the axis defined by inlet port 42 and first outlet port 44. T-connector 40 is configured to operate in a given vertical orientation with second outlet port 46 depending from T-connector 40. T-connector 40 further includes a sill 48, forming in the preferred orientation an extension of the bottom wall of inlet port 42, sill 48 extending partially over second outlet port branch opening 50. The bottom wall of first inlet port 42, and sill 48, are aligned at an elevation above the level of the bottom of first outlet port 44.

Flow-directing T-connector 40 is configured, particularly with respect to the elevation of the bottom of inlet port 42 and sill 48 above the bottom wall of first outlet port 44, to direct fuel directly through to first outlet port 44, bypassing second outlet port 46. While T-connector 40 is so configured using optimum fuel properties and flow rate, it will perform its function for a wide range of these properties. As fuel flows into inlet port 42, with T-connector properly arranged in a vertical orientation, having second outlet port 46 directed downwardly, the fuel will cascade over sill 48, bypassing opening 50 and substantially flowing directly through T-connector 40 to first outlet port 44. T-connector 40 is configured to continue this fuel flow, even upon inclination of T-connector 40 from the horizontal. When the through passage from inlet port 42 to first outlet port 44 is inclined from horizontal, within commonly known fuel station surface grades, the fuel will continue to flow substantially from inlet port 42 through outlet port 44. Only upon the development of substantial back pressure at first outlet port 44 will fuel be diverted into second outlet port branch opening 50 to pass through second outlet port 46. Such back pressure will develop as first fuel tank 20 reaches capacity, or upon only an extreme inclination of T-connector 40 toward inlet port 42, outside the design parameters of the system.

Referring once again to FIG. 1, fuel passing through fuel inlet line 12 will pass directly through T-connector 40 to first tank branch line 14 to first tank inlet 22 and into first tank 20. This fuel flow will continue until first tank 20 reaches fill line 24, effectively closing off first tank inlet 22 and vent/overflow outlet 26. Additional fuel flow will back up into first tank branch line 14 and cause a back pressure at first outlet port 44 of T-connector 40. Additional overflow can pass through vent/overflow outlet 26 and vapor relief line 18 to second tank 30. As fuel continues to flow through fuel inlet line 12, it is now diverted through T-connector 40 and second outlet port 46 to second branch line 16, and thus into second tank inlet 32 and second tank 30. As second tank 30 fills, excess vapor pressure is relieved through vapor relief outlet 36 until the fuel in tank 30 reaches fill line 34, thereby sealing vapor relief outlet 36. Upon sealing of vapor relief outlet 36, sufficient pressure will develop in fuel inlet line 12 to activate the typical automatic fuel shut off of a fuel dispensing nozzle (not shown).

In the preferred embodiment of the dual fuel tank simultaneous fill system, the engine fuel supply system, which draws fuel from one or more of the fuel tanks in the prior art references, will only draw fuel from first tank 20. This reduces the cost of the system by eliminating the requirement for dual fuel pump systems and piping, of the high-pressure type required for supplying fuel to the engine. As the system is configured to supply fuel primarily to first tank 20, the engine fuel supply system will have immediate access to any fuel added to the system. As an example, in a situation where a driver has run out of fuel along the side of the road, the first gallon of fuel out of a portable container will necessarily flow into first tank 20 where it is available to the engine fuel supply system. In prior art applications, this might not necessarily have been the case. As the engine fuel supply system draws fuel from first tank 20, a supplemental fuel transfer system 52 having a transfer pump 54 is envisioned for transferring fuel from second tank 30 to first tank 20. Such a fuel transfer system is generally of a lower pressure and performance specification than the system supplying fuel to the engine, and is therefore lower in cost. It further eliminates the need for automatic switching controls or manual switching controls for controlling multiple high-pressure type fuel pumps connected to multiple fuel tanks.

While the invention has been specifically described in connection with certain specific embodiments thereof, it is to be understood that this is by way of illustration and not of limitation, and the scope of the appended claims should be construed as broadly as the prior art will permit.

What is claimed is:

1. A tubing connector in the form of a T, having an upstream coupling and first and second downstream couplings, the first downstream coupling being axially parallel to the upstream coupling, and the second downstream coupling depending from the upstream coupling and first downstream coupling, the upstream coupling having a lower portion extending over a portion of the second downstream coupling, the lower portion being higher than a bottom portion of the first downstream coupling, whereby a fluid flowing into the upstream coupling will bypass the second downstream coupling until one of an overflow or back-pressure occurs at the first downstream coupling, causing a backflow into the first downstream coupling that flows by gravity into the second downstream coupling.

2. The connector according to claim 1, wherein the couplings are circular in cross section.

3. A fuel supply system for an automotive vehicle of the type having an internal combustion engine, the fuel supply system including at least two fuel storage tanks, a fuel pumping mechanism for transporting fuel from at least one of the storage tanks to the engine, a fuel transfer system for conveying fuel from one of the storage tanks to another of the storage tanks, and a fuel filling system for adding fuel to the system from a gas station, the fuel filling system comprising a single fuel inlet port, the improvement comprising:

a T-connector fluidly connecting the fuel inlet port with the at least two fuel storage tanks, the T-connector having an upstream coupling, a first downstream coupling fluidly connected to a first storage tank, and a second downstream coupling fluidly connected to at least a second storage tank, the first downstream coupling being axially parallel to the upstream coupling, and the second downstream coupling depending from the upstream coupling and first downstream coupling, the upstream coupling having a lower portion extending over a portion of the second downstream coupling, the lower portion being higher than a bottom portion of the first downstream coupling, whereby a fluid flowing into the upstream coupling will bypass the second downstream coupling until one of an overflow or back-pressure occurs at the first downstream coupling, causing a backflow into the first downstream coupling that flows by gravity into the second downstream coupling.

4. The system according to claim 3, further comprising a vapor venting system fluidly connecting the tanks to each other and to the atmosphere.

5. The system according to claim 3, wherein the fuel transfer system includes a pump fluidly connecting the at least two fuel storage tanks.

6. The system according to claim 3, wherein the fuel pumping mechanism transports fuel from the first tank to the engine.

7. A fuel supply system for an automotive vehicle of the type having an internal combustion engine, the fuel supply system including at least two fuel storage tanks, a fuel pumping mechanism for transporting fuel from at least one of the storage tanks to the engine, a fuel transfer system for conveying fuel from one of the storage tanks to another of the storage tanks, and a fuel filling system for adding fuel to the system from a gas station, the fuel filling system comprising a single fuel inlet port, the improvement comprising:

a first storage tank having a fill line at a first elevation, a second storage tank having a fill line at a second elevation, wherein the first elevation is lower than the second elevation, the fuel inlet port being fluidly connected to the first and second tanks so that the first tank fills first and the second tank fills second, the pipe including a T-connector with an inlet opening, a first outlet opening, and a second outlet opening, the inlet and first outlet openings being generally coaxial, and the second outlet opening transversely depending from an axis defined by the inlet and first outlet openings, the inlet opening being extended on a lower portion thereof, the lower portion extending over the second outlet opening and being higher than a lower portion of the first outlet opening, whereby any fluid entering the inlet opening bypasses the second outlet opening and flows to the first outlet opening, and any fluid entering the first outlet opening passes directly to the second outlet opening, wherein the inlet opening is fluidly connected to the fuel inlet port, the first outlet opening is fluidly connected to the first tank, and the second outlet opening is fluidly connected to the second tank.

8. The system according to claim 1, further comprising a vapor venting system fluidly connecting the tanks to each other and to the atmosphere.

9. The system according to claim 1, wherein the fuel transfer system includes a pump fluidly connecting the first tank to the second tank.

10. The system according to claim 1, wherein the fuel pumping mechanism transports fuel from the first tank to the engine.

\* \* \* \* \*